(12) United States Patent
Maurer

(10) Patent No.: US 9,039,485 B2
(45) Date of Patent: May 26, 2015

(54) METHOD FOR MACHINING A SERIES OF WORKPIECES BY MEANS OF AT LEAST ONE MACHINING JET

(71) Applicant: Micromachining AG, Aarwangen (CH)

(72) Inventor: Walter Maurer, Oftringen (CH)

(73) Assignee: MICROMACHINING AG, Aarwangen (CH)

(*) Notice: Subject to any disclaimer, the term of this patent is extended or adjusted under 35 U.S.C. 154(b) by 0 days.

(21) Appl. No.: 14/132,647

(22) Filed: Dec. 18, 2013

(65) Prior Publication Data

US 2014/0170935 A1 Jun. 19, 2014

(30) Foreign Application Priority Data

Dec. 18, 2012 (CH) .................................... 2853/12

(51) Int. Cl.
*B24C 1/04* (2006.01)
*B24B 49/02* (2006.01)
*B26D 5/00* (2006.01)
*B26F 3/00* (2006.01)
*B24C 3/02* (2006.01)
(Continued)

(52) U.S. Cl.
CPC .................. *B24B 49/02* (2013.01); *B24C 1/045* (2013.01); *B26D 5/00* (2013.01); *B26D 5/005* (2013.01); *B26F 3/004* (2013.01); *B24C 3/02* (2013.01); *B24C 3/04* (2013.01); *B23K 37/0235* (2013.01); *B23K 26/03* (2013.01); *B23K 26/032* (2013.01); *B23K 26/0884* (2013.01); *B23K 26/38* (2013.01); *B23K 26/388* (2013.01); *B23K 2201/001* (2013.01)

(58) Field of Classification Search
CPC ...... B24C 1/045; B24C 3/322; B24C 7/0046; B24C 3/062; B26F 3/004
USPC .......................... 451/2, 8, 9, 10, 5, 36–40, 99
See application file for complete search history.

(56) References Cited

U.S. PATENT DOCUMENTS 3,691,695 A * 9/1972 Green et al. ....................... 451/2
3,880,028 A * 4/1975 Frederick, Jr. ................... 83/880
(Continued)

FOREIGN PATENT DOCUMENTS

CN 101482744 A 7/2009
DE 102011103282 A1 12/2012
(Continued)

OTHER PUBLICATIONS

Swiss Search Report, dated May 24, 2013, from corresponding Swiss application.
(Continued)

*Primary Examiner* — George Nguyen
(74) *Attorney, Agent, or Firm* — Young & Thompson

(57) ABSTRACT

The method for machining a series of workpieces (21) via at least one machining jet includes the following steps:
  each workpiece (21) is associated with an identifier for uniquely identifying the workpiece,
  during the machining of a respective workpiece, the temporal characteristic of the machining jet is detected by at least one sensor (30),
  the detected temporal characteristic is evaluated so as to obtain at least one comparative value, and
  for detecting incorrect machining, the at least one comparative value is compared with at least one threshold value.

23 Claims, 3 Drawing Sheets

(51) Int. Cl.
*B24C 3/04* (2006.01)
*B23K 37/02* (2006.01)
*B23K 26/03* (2006.01)
*B23K 26/08* (2014.01)
*B23K 26/38* (2014.01)

(56) References Cited

U.S. PATENT DOCUMENTS

| | | | | |
|---|---|---|---|---|
| 4,346,537 | A * | 8/1982 | Masujima et al. | 451/5 |
| 4,395,849 | A * | 8/1983 | Kasai et al. | 451/2 |
| 4,827,679 | A * | 5/1989 | Earle, III | 451/40 |
| 5,027,562 | A * | 7/1991 | Kobayashi et al. | 451/11 |
| 5,212,976 | A | 5/1993 | Company | |
| 5,222,329 | A * | 6/1993 | Yu | 451/11 |
| 5,240,552 | A * | 8/1993 | Yu et al. | 438/5 |
| 5,439,551 | A * | 8/1995 | Meikle et al. | 438/5 |
| 5,854,744 | A | 12/1998 | Zeng et al. | |
| 6,120,351 | A * | 9/2000 | Zeng | 451/28 |
| 6,155,245 | A * | 12/2000 | Zanzuri | 125/12 |
| 6,244,927 | B1 * | 6/2001 | Zeng | 451/2 |
| 6,769,956 | B1 * | 8/2004 | Konieczny | 451/2 |
| 6,814,649 | B2 * | 11/2004 | Schmall | 451/2 |
| 7,640,125 | B2 | 12/2009 | D'Angelo et al. | |
| 2001/0004800 | A1 * | 6/2001 | Yoshida et al. | 29/737 |
| 2002/0084540 | A1 * | 7/2002 | Bauer | 264/12 |
| 2002/0102920 | A1 * | 8/2002 | Vogtmann et al. | 451/41 |
| 2002/0155790 | A1 * | 10/2002 | Ido et al. | 451/9 |
| 2004/0032597 | A1 | 2/2004 | Esmiller | |
| 2005/0191951 | A1 | 9/2005 | Sekiya | |
| 2009/0311944 | A1 * | 12/2009 | Olsen | 451/2 |
| 2010/0193484 | A1 | 8/2010 | Chen et al. | |
| 2014/0170935 | A1 * | 6/2014 | Maurer | 451/8 |

FOREIGN PATENT DOCUMENTS

| | | |
|---|---|---|
| EP | 0 522 932 A1 | 1/1993 |
| EP | 0 816 957 A2 | 1/1998 |
| EP | 1 577 727 A1 | 9/2005 |
| FR | 2 699 852 A1 | 7/1994 |
| WO | 02/02268 A1 | 1/2002 |
| WO | 2012163545 A1 | 12/2012 |

OTHER PUBLICATIONS

Database WPI Thompson Scientific, London, GB, XP002721623 & CN101482744A, Jiangsy Jiabao Technology Tube Making, 2009.
European Search Report, dated Mar. 12, 2014, from corresponding EP application.

* cited by examiner

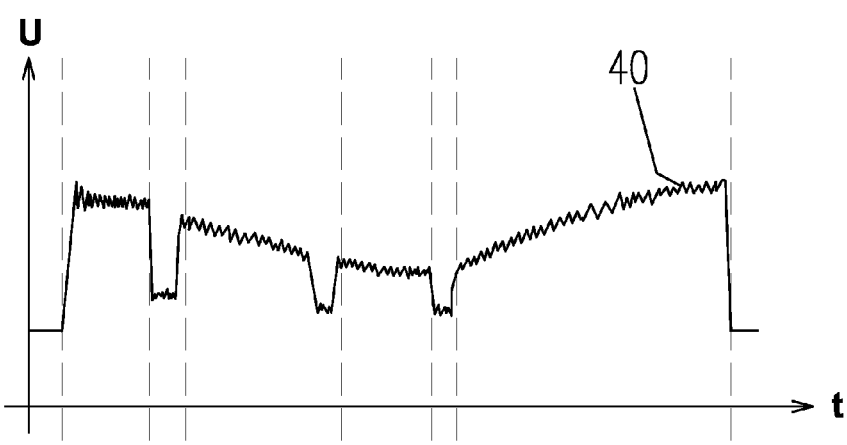
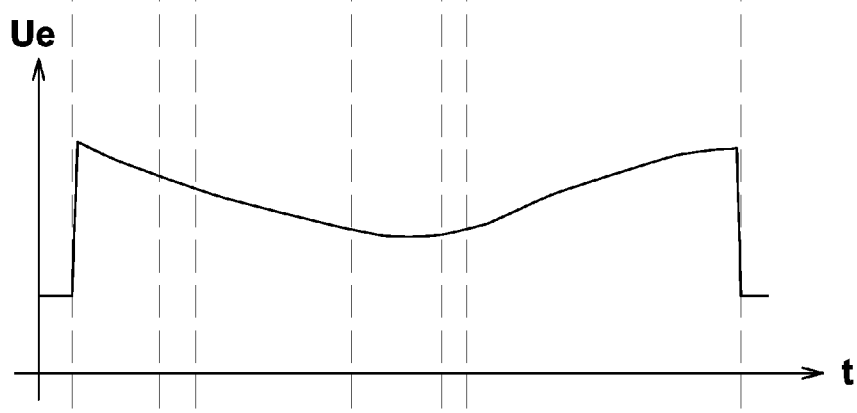
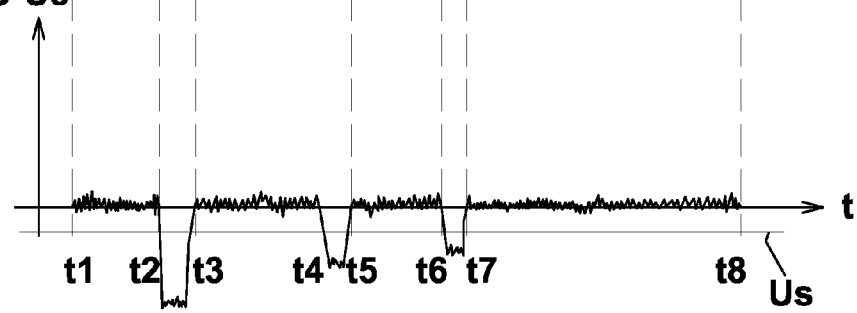

METHOD FOR MACHINING A SERIES OF WORKPIECES BY MEANS OF AT LEAST ONE MACHINING JET

BACKGROUND OF THE INVENTION

The present invention relates to a method for machining a series of workpieces by means of at least one machining jet.

Various media are used, e.g., fluids, photons and/or gas, in order to generate a machining jet. Said jet does not have a fixed geometry, but forms a kind of dynamic tool, the temporal characteristic of which is variable. If, e.g., the liquid jet is formed from water containing abrasive material, it may occur that the abrasive material is temporarily fed to the water to a reduced extent, and the liquid jet therefore acts on the workpiece with reduced energy. When machining by means of a laser, flame cutting or plasma jet, it may occur, e.g., that molten material precipitates, for example, in the form of beads on the surface of the workpiece. If these beads can be found on a machining area on which the workpiece is still to be machined, the machining jet will act with a different geometry on the workpiece than was intended.

The temporal change of the machining jet can result in that the workpieces are machined with varying quality. The conventional methods require that each workpiece is checked during the final inspection in order to be able to find the ones of lower quality. As a result, the production of the workpieces is relatively complex and results in increased scrap.

In U.S. Pat. No. 7,640,125 B2, a method is described, in which a reference signal is acquired and evaluated in order to perform a quality control when laser welding two plates for instance. No measures are provided for simplifying such a control when a series of several workpieces is to be machined.

U.S. Pat. No. 5,854,744 describes a method for abrasive water jet cutting, in which the pressure in the nozzle is detected and a corresponding signal is fed to the control unit. Also in this method, no measures are provided for simplifying a quality control in a series of workpieces.

SUMMARY OF THE INVENTION

It is an object of the present invention to provide a more efficient method for machining a series of workpieces by means of a machining jet.

This object is achieved by a method, wherein each workpiece is associated with an identifier and the temporal characteristic of the machining jet during the machining of a respective workpiece is detected by means of at least one sensor, evaluated, and compared with at least one threshold value. Thereby, machining errors can be detected in a simplified manner.

Preferably, an error indicator is associated with the workpiece. Thereby, those workpieces which have a positive error indicator can be specifically checked during the final inspection for their actual machining quality.

BRIEF DESCRIPTION OF THE DRAWINGS

The invention is explained hereinafter by means of an exemplary embodiment with reference to the figures. In the figures:

FIG. 4a shows the temporal course of a measurement signal during the operation of the machining device according to FIG. 1;

FIG. 4b shows the temporal course of the expected sensor signal; and

FIG. 4c shows the difference between the measurement signal and the expected sensor signal.

DETAILED DESCRIPTION OF THE PREFERRED EMBODIMENTS

Figure 1:
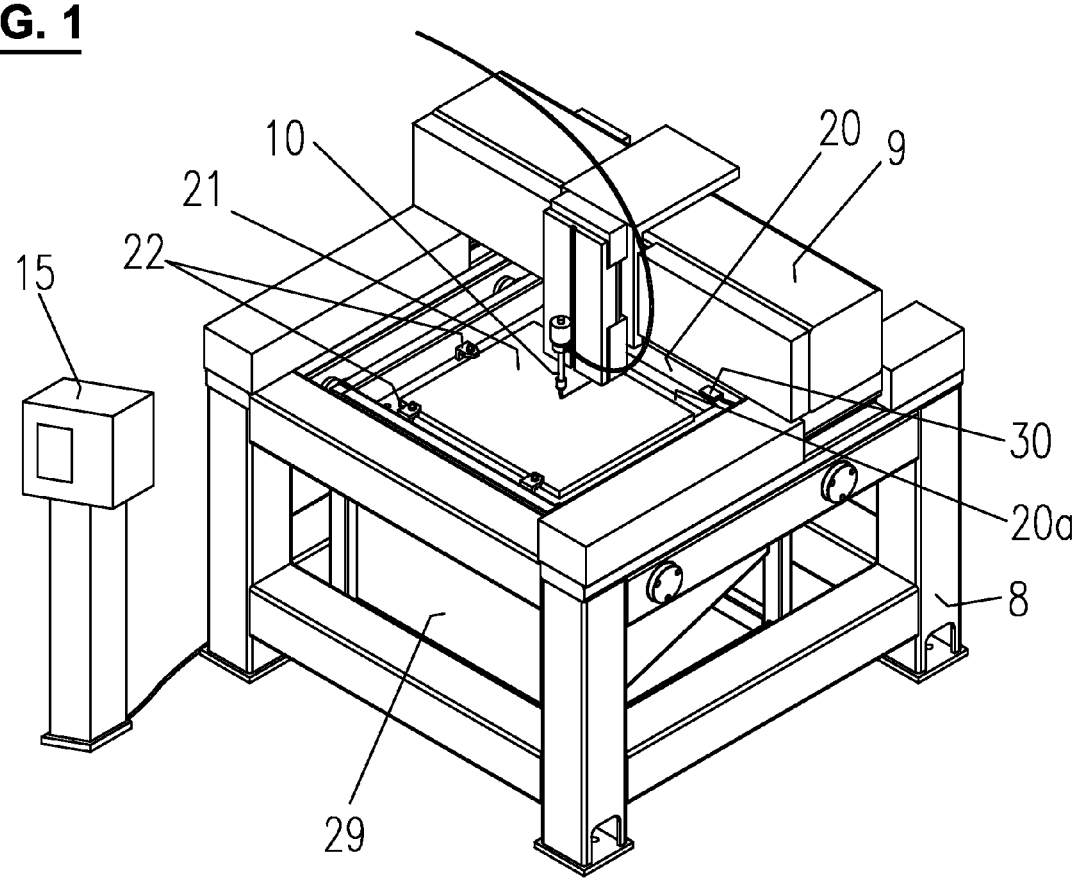
FIG. 1 shows a perspective view of machining device according to the invention.

FIG. 1 shows a machining device having a frame construction 8 which stands on the floor and on which a movable bridge 9 is arranged. Arranged on said bridge is a machining head 10 that can be moved transverse to the bridge 9 and therefore can be moved in the horizontal plane. Furthermore, the machining head 10 can be moved vertical to this plane. Thus, the machining head can be moved at least in three independent axes. Controlling the machining head 10 takes place via a controller 15, for example, a numeric controller in the form of a CNC controller.

The machining device is equipped with the usual components in order to generate, during the operation, a machining jet which, when exiting the machining head 10, machines a workpiece 21. Machining is carried out, e.g., by means of a jet that is formed by a liquid under high pressure or thermally, i.e., under the influence of heat, or by means of a combination thereof. Examples of machining jets are as follows:

Water jet from pure water for pure water jet cutting,
water jet from water with added abrasive material for abrasive water jet cutting (for forming a water abrasive suspension jet, the abrasive material can already be added at the high pressure pump or, for forming an abrasive injector jet, can be added only in the machining head 10),
a jet formed from a liquid other than water, with or without additional abrasive material,
a jet formed from another medium such as photons and/or gas, for example a laser jet, plasma jet, flame cutting jet, etc.

Machining can include different processes, e.g.:
cutting through a material layer, in particular cutting a workpiece by cutting it, e.g., along a contour, or drilling holes,
structuring the workpiece surface, in particular engraving, and/or removing material,
compacting the workpiece surface.

The controller 15 comprises conventional devices for inputting and outputting information such as a keyboard, a monitor and/or a pointing device (e.g., a touchscreen), etc. and means for data processing and for generating control signals which effect movement of the machining head 10 during the operation. Preferably, these means comprise a computer that has a central processing unit (CPU) and a memory, e.g. in the form of a random access memory (RAM), and/or a hard disk.

The machining device comprises a workpiece support 20 on which a workpiece to be machined is supported. In the present exemplary embodiment, the workpiece support 20 is provided in the inner region with a recess 20a and thus forms a frame on which the workpiece 21 is supported on the edge. The machining device is provided with holding means 22 for holding the workpiece 21. The holding means 22 are formed, e.g., as clamps, by means of which the workpiece 21 is pressed against the workpiece support 20.

If the machining jet is formed as a liquid jet, then—as shown here in the exemplary embodiment according to FIG. 1—a collecting tank 29 ("jet catcher") fillable with water is arranged within the frame construction 8. The collecting tank 29 serves for dissipating the residual energy inherent in the liquid jet after penetrating through the workpiece 21.

For detecting the temporal characteristic of the machining jet, the machining device has at least one sensor 30. Said sensor is connected to the controller 15 in which the data delivered from the sensor 30 are evaluated.

Depending on the configuration of the machining jet, different types of sensors can be used, e.g., acoustic sensors, optical sensors, in particular imaging sensors, and pressure sensors. Possible types of sensors are explained in detail hereinafter.

a) Sound sensor for detecting structure-borne sound:

During machining using the machining jet, energy is locally released in the workpiece 21, which effects the generation of elastic waves which propagate in the workpiece 21 and generate the so-called structure-borne sound.

Figure 3:
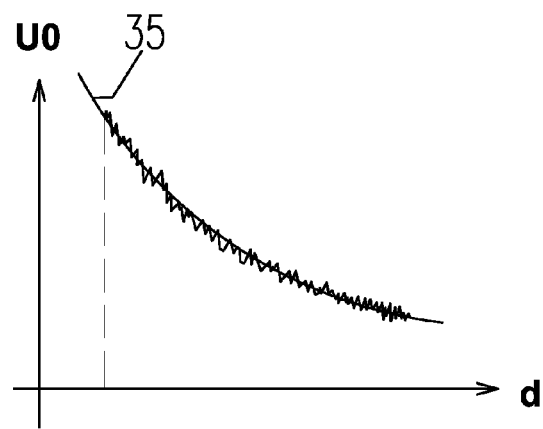
FIG. 3 shows the signal of a sensor as a function of the distance between the sensor and the machining area.

As explained below with reference to the FIGS. 3 and 4, the temporal changes in the characteristic of the machining jet cause corresponding changes in the sound level.

For detecting the structure-borne sound, the sensor 30 is arranged on the workpiece or on the machining device itself, e.g., at the workpiece support 20, as illustrated in FIG. 1. In this second variant, sound transmission from the workpiece 21 to the workpiece support 20 is ensured in that the workpiece 21 is firmly clamped by means of the holding means 22. In order to protect the sensor 30 against harmful effects caused by the machining jet and/or against contaminants, a recess can be provided in the workpiece support 20, in which the sensor 30 is received and which is formed to be closed at least on the sides facing towards the workpiece 21 or the machining jet.

Depending on the intended use, the sensor 30 can also be arranged on other places of the machining device, e.g., on or in the cutting head 10, at the pump, etc.

Suitable as a sensor 30 is, among others, an acoustic emission sensor. The latter is constructed, e.g., in the form of a sensor housing in which a piezoelectric measuring element is arranged. The sensor 30 is secured on the workpiece support 30, e.g., by means of a screw, or magnetically so that vibrations of the workpiece support 21 are transmitted to the piezoelectric measuring element.

b) Sound sensor for detecting the sound generated by the machining jet:

If a liquid jet is used as a machining jet, this jet exits the machining head 10 with high speed. This generates, among other things, sound that propagates in the air. Suitable for detecting these vibrations is, e.g., a microphone.

Similar to the structure-borne sound described above, changes in the characteristic of the machining jet effect changes in the airborne sound.

c) Sensor for detecting the pressure:

In particular a liquid jet used as the machining jet acts during machining with a certain pressure on the workpiece 21. The pressure varies if the characteristic of the machining jet changes operatively. The pressure can be detected by means of a pressure sensor which is arranged, e.g., between the workpiece 21 and the workpiece support 20.

d) Imaging sensor:

It is also possible to detect the characteristic of the machining jet by means of an imaging sensor in the form of a camera.

During machining by means of a liquid jet, e.g., a cloud of liquid and material removed from the workpiece 21 forms at the machining area. It was found within the context of the present invention that changes in the characteristic of the liquid jet changes the configuration of the cloud, e.g., the size thereof. By capturing the cloud and evaluating the images, the current characteristic of the liquid jet can be concluded.

If machining is carried out under the influence of heat, a thermographic camera can be used so as to capture the machining jet and the machining area in images. Here too, changes in the characteristic of the machining jet can be detected by evaluating the images.

Figure 2:
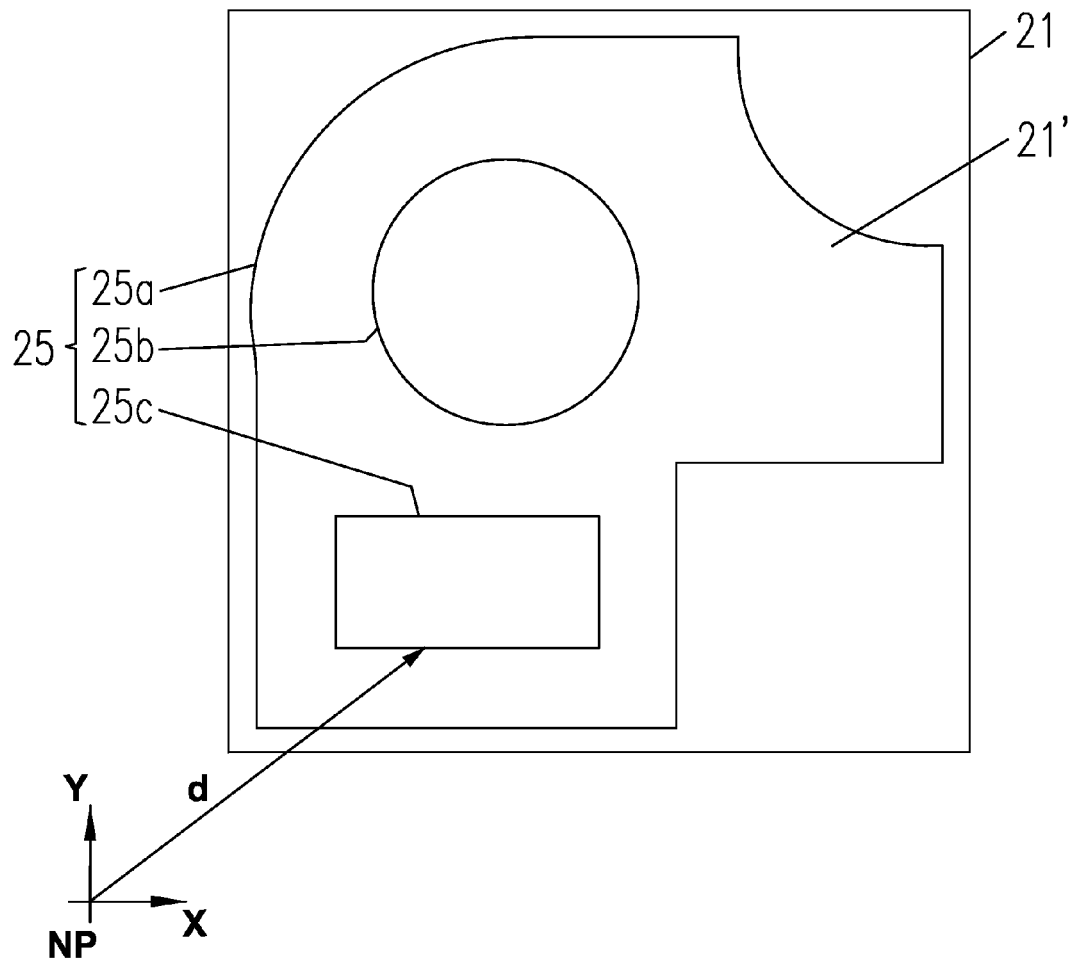
FIG. 2 shows a top view of an example of a workpiece to be machined.

FIG. 2 shows an example of a plate as a workpiece 21 from which a given shape 21' is to be cut out. This shape is defined by the contour 25. In the present example, the shape 21' has two cut-outs so that the contour 25 is composed of an outer contour 25a and two inner contours 25b and 25c. Depending on the configuration of the machining jet, the wall resulting from the cut through the material layer of the workpiece 21 will not be exactly perpendicular to the upper side of the workpiece 21. In this case, the contour on the lower side of the workpiece will not exactly match the contour 25 on the upper side. Thus, the cut wall will be reworked, if necessary, so as to achieve the required quality.

FIG. 2 also shows an X-Y coordinate system, wherein it is assumed for the following explanation that a sound sensor as the sensor 30 is arranged in the origin NP of the coordinate system. The sensor 30 is stationary, whereas the machining head 10 is moved so as to move the machining jet along the contour 25. Therefore, the distance d between the sensor 30 and the machining head 10 and therefore between the sensor 30 and the machining jet will change over time. Correspondingly, the measuring signal of the sensor will be stronger or weaker.

In order to filter out this system inherent change when machining the workpiece 21, the measuring signal is calibrated in advance. For this purpose, at least one test workpiece is machined with the machining jet by moving said jet, e.g., away from the minimum distance from the origin NP, and the measuring signal is detected as a function of the distance d. FIG. 3 shows exemplary the fluctuating measuring signal U0 as a function of the distance d. The measuring signal U0 typically is a voltage value that corresponds to the intensity of the sound. For refining the correlation between the signal U0 and the distance d, the machining jet can travel along a plurality of machining paths, and the respective measured values can be averaged.

Subsequently, e.g., a mathematical function is fitted to the collected measured values. Said function is illustrated in FIG. 3 by the curve 35 drawn in a solid line. Alternatively, it is also possible to prepare a table that includes the signal values U0 and the associated distance values d.

These calibration data in the form of the function or the table are subsequently used by the controller 15 for calculating an expected sensor signal Ue in the time t for the machining operation on a given workpiece 21. From the data defining the contour 25 to be cut, the controller 15 determines by means of a program the temporal course of the distance d, and, subsequently, by means of the calibration data, determines the temporal progression of the sensor signal Ue to be expected. Ue thus delivers standard values that can be compared with the signal U which is measured when machining the workpiece 21.

FIG. 4b shows exemplary the sensor signal Ue to be expected as a function of the time t. FIG. 4a shows exemplary the temporal course 40 of a measuring signal U which is provided by the sensor 30 when machining a workpiece 21. The lowermost diagram according to FIG. 4c shows U-Ue, i.e., the difference between the measuring signal U and the expected sensor signal Ue.

In the example according to FIG. 4, different points in time, t1 to t8, are marked on the time axis t, which indicate the following machining states:

From time t=0 to t=t1 and from time t8 onward, the machining device is in each case in operation, but with the machining jet turned off.

At t1, the machining jet is turned on and impinges on the workpiece. The signal U of the sensor 30 now fluctuates in a certain region. Between the time intervals t1 and t2, t3 and t4, t5 and t6 as well as t7 and t8, the machining jet in each case corresponds substantially to the expected characteristic so that the fluctuations are minor.

Between t2 and t3, t4 and t5 as well as t6 and t7, the characteristic of the machining jet has noticeably changed so that the jet no longer corresponds to the standard state. For example, it can occur that during abrasive water jet cutting, the abrasive material is fed to the water to a reduced extent and the machining jet therefore acts on the workpiece with reduced energy.

A deviation from the standard state is visible in the signal progression curve 40 due to the fact that the signal value U drops to a significantly lower level. The signal progression according to FIG. 4c shows that then the value U-Ue differs significantly from zero.

In order to detect such deviations from the standard state, the controller 15 evaluates the signal progression 40 based on certain criteria. For example, a deviation that no longer can be tolerable is given if the following criterion is met:

In the time period from t1 to t8, the value U deviates at least once during a given time ts or longer from the standard value Ue by more than a given threshold value Us: $|U-Ue|>Us$ for a time interval $t \geq ts$.

In order to obtain a comparative value, the acquired sensor signal U can also be evaluated such that a running average is calculated during the machining and the value Ue is subtracted thereof, in order to filter out the system inherent changes when moving the machining jet.

A changed characteristic of the machining jet can result in that a workpiece of reduced quality is machined. The machining device described here enables that when machining a series of workpieces, an indicator ("error indicator") is obtained for those workpieces, which possibly have been machined with reduced quality. During the final inspection it is therefore not necessary to thoroughly check all workpieces; rather, it is sufficient to check the workpieces having a positive error indicator.

The method for machining is carried out, e.g., as follows:

Each workpiece in a series is associated with an identifier which allows identifying the workpiece. The identifiers can be, e.g., an ascending sequence of numbers that is generated by the controller 15, or, it is conceivable to use as the identifier the data that correspond to the date and time of machining a workpiece.

When machining a respective workpiece, the temporal characteristic of the machining jet is detected by means of the sensor 30. According to the example illustrated above, a signal U(t) is therefore obtained for each workpiece.

The detected temporal characteristic is evaluated so as to obtain at least one comparative value. According to the example illustrated above, the difference $Uv=|U-Ue|$ is formed, wherein Ue corresponds to the expectation level of the sensor 30 determined based on the calibration, and U are the values in the interval of t1 and t8. The values of U, which are measured when the machining jet is turned off, thus prior to t1 and after t8, are not taken into account here.

The workpiece is associated with an error indicator which is defined as a function of the deviation of the at least one comparative value from at least one standard value. According to the example illustrated above, the workpiece is associated with an error indicator if the difference Uv is once or several times greater than Us during at least ts: Uv>Us for a time interval $t \geq ts$. The error indicator can be in the form of a flag, for example:

"0" for "no deviation detected" and
"1" for "deviation detected"

During the final inspection, those workpieces are checked more thoroughly for their machining quality, the flag of which is set to "1".

Together with the flag, or as an alternative to the flag, other data can also be stored for each workpiece.

For example, it is conceivable to store data which provide the connection to the time t at which the machining jet has machined a given machining area on the workpiece 21 (hereinafter referred to as "XY data"). Depending on the design of the machining device, these XY data can for instance be the coordinates of the machining areas in a plane or in space and/or, in case of a plurality of areas on the workpiece to be machined, a number, which is associated to the respective machining area.

Thus, it is possible to store a deviation Uv, which is greater than the threshold value Us, together with the coordinates of the machining area at which this undesirable deviation has occurred. This allows a particularly simple final inspection since it is possible to check the workpiece specifically at those places for their desired machining quality at which an irregularity in the characteristic of the machining jet has occurred.

For example, during the production of turbine blades, a multiplicity of holes is to be drilled. The number of holes can be several hundreds of holes so that measuring each hole is very time-consuming. By additionally recording the XY data, which represent the temporal progression of the position of the machining jet, it is possible in the case of a respective turbine blade to specifically find and measure those holes, for which the values measured by the sensor 30 show an undesirable deviation.

The XY data, which represent the temporal progression of the position of the machining jet, can be obtained in various ways:

For example, the controller 15 is configured in such a manner that from the program data, which determine the temporal movement of the machining head 10 for the respective machining, the XY data can be read out and/or generated. This is possible, e.g., in the case of controllers 15 which include a PLC ("Programmable Logic Controller").

For precise positioning of the machining head 10, the machining device is provided in most cases with a feedback control, by means of which the motors for moving the machining head 10 are feedback-controlled. Here, the actual value is detected by means of suitable sensors, e.g., incremental encoders for detecting position and/or angular changes, and the position is corrected in accordance with the deviation of the setpoint value. It is therefore possible to determine the temporal movement of the machining head 10 from the signals of the sensors.

Furthermore, it is conceivable to provide a separate measuring system which includes one or a plurality of sensors in order to detect the movement of the machining head 10 over time.

As a further variant it is conceivable to prepare and store a protocol which contains one or more of the following pieces of information:

identifier of the workpiece, error indicator, the coordinates (Xb, Yb) of the areas which have been machined as a function of the time and/or the distance, in case of a plurality of machining areas on the workpiece, a unique number N, which is associated to the respective machining area (the workpiece has for instance a given number of contour lines as machining areas, which are numbered, e.g., from 1 to N1), the signal U as a function of the time, the number N and/or the coordinates (Xb, Yb), the calibration level Ue as a function of the time, the number N and/or the coordinates (Xb, Yb), the deviation Uv as a function of the time, the number N and/or the coordinates (Xb, Yb).

The coordinates (Xb, Yb) mentioned above may comprise X-, Y- and/or Z-coordinates.

Preparing a protocol is useful, e.g., if the workpiece to be machined is to be used in a field in which particularly high requirements with regard to safety have to be met, e.g., in aircraft construction, in medical technology, in turbine construction, etc.

Generating and storing data on the production process, as outlined above, offer the possibility to verify retroactively the progress of production of the respective workpiece. This can for instance be done when the question of guarantee or liability arises.

In an exemplified embodiment, the X-, Y- and Z-positions are read out from the controller and recorded in time together with the measuring signals. A possible evaluation can also be performed in the offline mode. A unique identification is added to the data, such as date, time, parameters set, program, number of the workpiece, number of the contour and position on the contour.

As a further variant it is also conceivable to use the detected deviation Uv for controlling the machining process in order to optimize said process in this manner. For this purpose, the at least one sensor 30 is part of a closed loop control that is configured for changing the characteristic of the machining jet based on the deviation Uv. During the feedback control, the current value of Uv is continuously calculated as "actual value" by the controller 15 and is compared with the preset "setpoint value", which is zero here. If the system deviation is too large (according to the example above, if the difference between the actual value and the setpoint value is above the threshold value), the controller 15 controls the machine tool in such a manner that certain process parameters are changed. For example, the travel speed of the machining jet and/or its operative machining energy can be reduced. Thus, e.g., the pressure during machining by means of a liquid jet is reduced so that the jet exits the machining head 10 at a lower speed. If the liquid jet is used together with abrasive material, an adjustable process parameter is also given in that the amount of added abrasive material is changed.

The feedback control can also be set up in such a manner that in the case of an increasing frequency of events in which the deviation Uv exceeds the threshold value and then falls below the threshold value again, the machining process is interrupted so as to give the user the opportunity to check the settings on the machine tool. For example, in the case of abrasive water jet cutting, it can occur that the abrasive material is fed in batches to the water, resulting in an undesirable pulsating operation of the liquid jet.

As a further variant it is conceivable to use the temporal characteristic which is acquired at the beginning of the workpiece machining process for detecting errors in the chosen settings. For example, several setting parameters are to be inputted for the setting, such as material type of the workpiece to be machined, thickness of the workpiece, pressure and type of the abrasive material in the case of abrasive water jet cutting, etc. In the controller 15, a table is stored which defines the relationship between the setting parameters and the sensor signal to be expected. This table can be obtained empirically and/or by means of test runs and/or results from a calculation based on data acquired empirically and formulas. For instance, the table is configured such that the sensor signal to be expected for certain given setting parameters is in a given frequency range. In operation, the controller 15 controls whether the sensor signal measured corresponds to the frequencies which are to be expected for the setting parameters inputted. If this is not the case, the controller 15 produces an error message. Subsequently, the user can check the actual settings and correct them accordingly.

For the comparison between values to be expected and values measured it is also possible to use stored data, which comprise for a particular reference material the frequency and/or energy to be expected.

In general, the production control and the production validation for a particular suitable material can be advantageous for instance in the production of pieces for medical technology.

From the preceding description, numerous modifications are at the disposal of a person skilled in the art without departing from the scope of the invention defined by the claims.

It is conceivable to use two or more sensors 30 in order to detect the temporal characteristic of the machining jet. The sensors 30 are arranged at different locations on the machining device so that the signal progression with regard to the level and/or the time is usually different. Through the measurement by means of a plurality of sensors 30, it is possible, among other things, to precisely determine time delays between the occurrence of an undesirable deviation in the characteristic of the machining jet and the actual measurement. The undesirable deviation thus can be allocated very precisely to the machining area on the workpiece where the deviation has occurred, and therefore, where the machining was potentially not optimal.

In a simplified embodiment, the time delay can also be taken into account during the measurement by means of a single sensor 30 by including a temporal correction value in the calculation, which correction value, e.g., is determined experimentally.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for machining a series of workpieces by means of at least one machining jet, wherein in the method
   each workpiece is associated with an identifier for uniquely identifying the workpiece,
   during the machining of a respective workpiece, a temporal characteristic of said at least one machining jet is detected by means of at least one sensor,
   the detected temporal characteristic is evaluated so as to obtain at least one comparative value, and
   for detecting incorrect machining, said at least one comparative value is compared with at least one threshold value.

2. The method according to claim 1, wherein the respective workpiece is associated with an error indicator which is determined as a function of a deviation of said at least one comparative value from said at least one threshold value.

3. The method according to claim 2, wherein the error indicator comprises a flag.

4. The method according to claim 2, wherein information can be obtained from the error indicator, which information indicates at which of the machining areas, at which the workpiece has been machined by means of said at least one machining jet, the absolute value of said at least one comparative value is greater than said at least one threshold value.

5. The method according to claim 1, wherein said at least one comparative value is formed as a function of a predetermined expectation value.

6. The method according to claim 5, wherein said at least one comparative value Uv is formed as absolute value of the difference between a measurement signal U of said at least one sensor and the expectation value Ue: $Uv=|U-Ue|$.

7. The method according to claim 1, wherein the existence of an error during machining is determined as a function of the following criterion: when machining a workpiece, there is at least one time interval which lasts at least for a predetermined time, and during which the absolute value of said at least one comparative value exceeds said at least one threshold.

8. The method according to claim 1, wherein a calibration is carried out in which, with said at least one machining jet turned on, a signal of said at least one sensor is detected as a function of a distance of said at least one machining jet from a point of origin.

9. The method according to claim 8, wherein the calibration is carried out prior to machining the series of workpieces.

10. The method according to claim 1, wherein said at least one sensor is part of a closed loop control for changing a characteristic of said at least one machining jet in dependence on a deviation of said at least one comparative value from said at least one threshold value.

11. The method according to claim 10, wherein the closed loop control comprises at least one of the following components:
 a drive for moving said at least one machining jet,
 a pump for ejecting said at least one machining jet under pressure out of a machining head,
 a dosing device for adding abrasive material to said at least one machining jet.

12. The method according to claim 1, wherein machining a workpiece is interrupted if said at least one comparative value exceeds or falls below said at least one threshold value several times in a row.

13. The method according to claim 1, wherein, during the machining, a workpiece is supported on a workpiece support which comprises said at least one sensor.

14. The method according to claim 1, wherein said at least one sensor is configured to perform at least one of the following operations:
 detecting vibrations in at least one of a solid body, a liquid and air,
 detecting a pressure which said at least one machining jet exerts onto a workpiece support or a workpiece or onto both,
 detecting said at least one machining jet optically.

15. The method according to claim 1, wherein said at least one machining jet is formed from at least one of the following media:
 a liquid with or without abrasive particles,
 gas,
 photons.

16. The method according to claim 1, wherein the obtaining of said at least one comparative value comprises a comparison of the detected temporal characteristic with calibration values, which define a change of a signal of said least one sensor when a distance between said at least one machining jet and said at least one sensor is changed.

17. The method according to claim 1, wherein, for detecting an incorrect setting, said at least one comparative value is obtained by evaluating the acquired temporal characteristic and comparing it with data stored, which data define a relationship between setting parameters and a sensor signal to be expected and which data are used for obtaining said at least one threshold value.

18. The method according to claim 17, wherein the comparison is done in a frequency spectrum.

19. The method according to claim 1, wherein for the respective machined workpiece data are stored, which comprise the identifier and information on the detected temporal characteristic, wherein the data serves for a verification of required production conditions.

20. The method according to claim 1, wherein machining the series of workpieces comprises at least one of structuring a workpiece surface, compacting a workpiece surface, cutting and drilling.

21. A machining device, which is configured to implement the method according to claim 1, wherein
 the machining device is configured to generate during the operation at least one machining jet for machining workpieces, the machining device
 comprising at least one sensor for detecting a temporal characteristic of said at least one machining jet when machining the workpieces, wherein
 the machining device is provided with a program on execution of which the method is implementable.

22. The machining device according to claim 21, further comprising a workpiece support which comprises said at least one sensor and on which a workpiece is supported during machining.

23. The machining device according to claim 21, further comprising a workpiece support which comprises a frame on which a workpiece can be fastened by means of holding means.

* * * * *